Patented Nov. 12, 1929

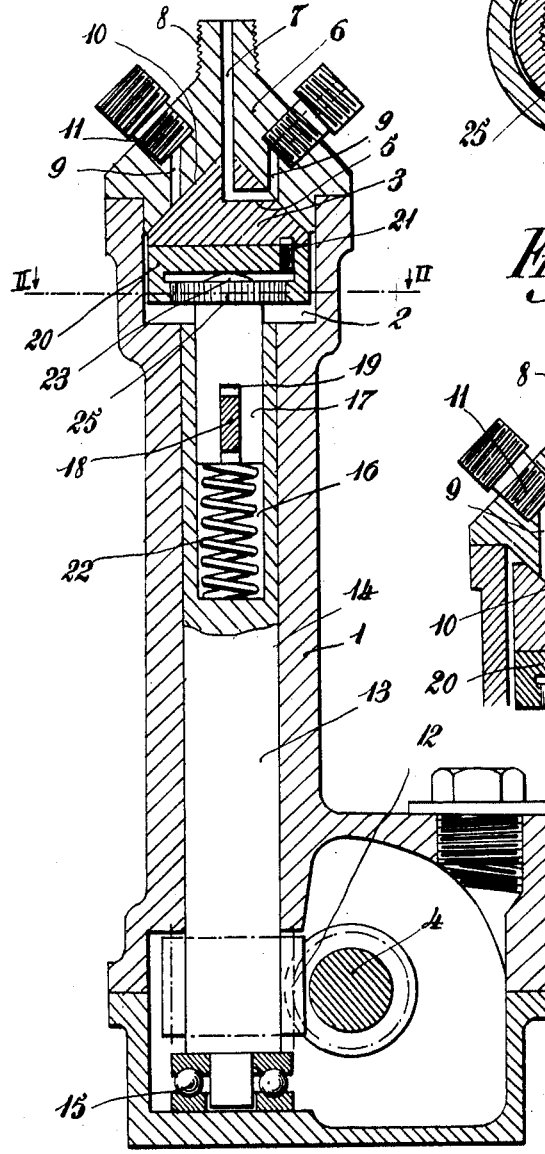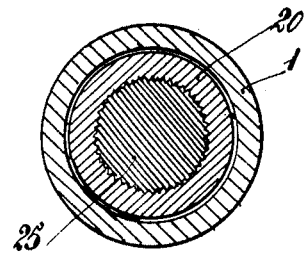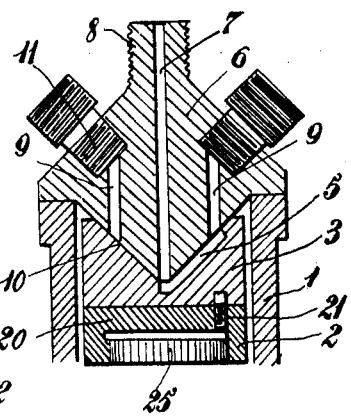

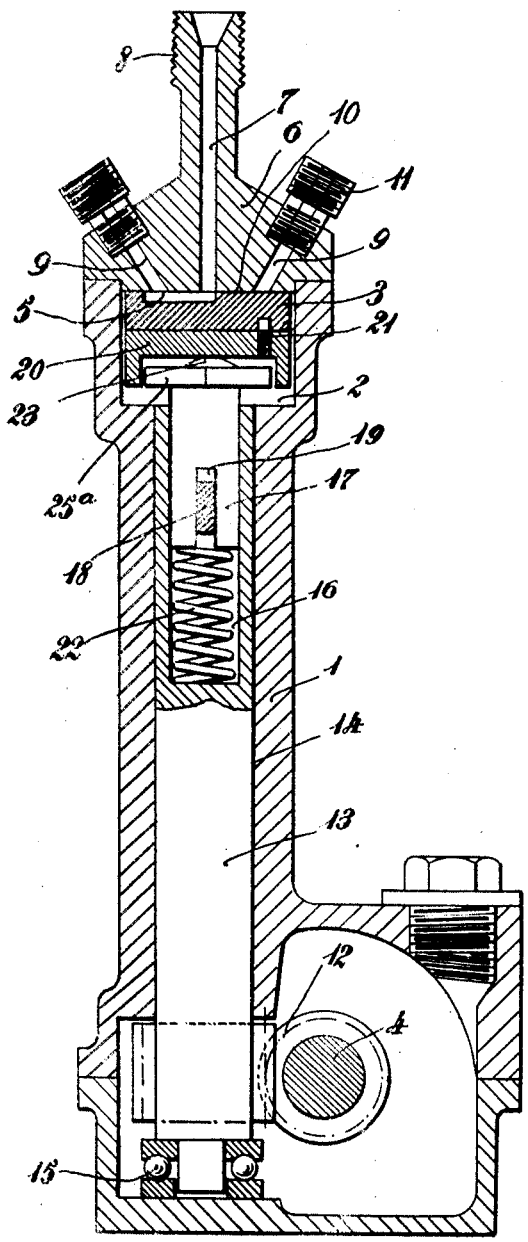

1,735,032

UNITED STATES PATENT OFFICE

LOUIS HENRI LIBERT BELLEM, OF ASNIERES, FRANCE

FUEL-SUPPLYING DEVICE

Application filed January 25, 1927, Serial No. 163,483, and in France May 28, 1926.

The present invention relates to a device for supplying fuel to multi-cylinder internal combustion engines fed with all manner of fuels and more especially with heavy fuels.

The feed valve according to the invention is of the type comprising a rotary slide valve driven by the engine itself and having a distributing port constantly communicating with the fuel delivery duct and which, during the rotation of the slide valve, successively comes into communication with ducts each connecting with one of the engine cylinders and opening on to the surface of a fixed seat against which the said slide valve is tightly applied, the fuel inlet duct thereby being successively put into communication with each of the cylinders to be fed.

According to the invention the rotary slide valve is made of a substance strongly resisting wear and having a certain degree of malleability and also providing a good fitting tightness such for example as fibre, hard wood and the like.

Seizure is not produced with a substance of this nature when for any reason small foreign substances are present in the fuel, as these substances become lodged in the rotary slide valve without harming the fitting tightness.

According to one characteristic of the invention, the rotary slide valve is driven from the engine shaft through a shaft coaxial with the slide valve and which, driven with the desired gear reduction by the engine, rotates solid with the slide valve, whilst at the same time it can be displaced longitudinally relative to said valve. This shaft is maintained constantly pressed against the said valve by means of a spring or the like so as to apply the valve against the fixed seat.

According to one embodiment of the invention, the aforesaid thrust shaft is driven from the engine through a shaft coaxial with said thrust shaft, the aforesaid spring being then lodged between these two shafts which rotate as a whole but which may be shifted longitudinally one relative to the other.

The thrust on the slide valve is exerted by means of a spherical or similarly shaped cap forming a ball head and acting on a disc integral with the slide valve and having a recess in which a member of corresponding form, carried by the thrust shaft, engages with a certain amount of play in order to transmit the rotation.

The contacting surfaces of the rotary slide valve and the fixed seat may be plain surfaces or surfaces of revolution (e. g. conic or cone frustra).

A square head fitting into a similarly formed recess of the disc which is integral with the rotatory slide valve, is provided at the upper end of the aforesaid thrust shaft.

According to a modified form of construction, the upper end of this shaft carries an externally toothed washer, the teeth of which engage into corresponding teeth of a recess provided in the disc.

Other characteristic features of the invention will appear from the following description made in conjunction with the appended drawings in which:

Fig. 1 shows one form of embodiment of the valve gear according to the invention.

Fig. 2 is a section along II—II Fig. 1 of this device.

Fig. 3 shows a modified form of construction, and

Fig. 4 another modified form of construction.

The valve gear according to the invention essentially comprises a frame 1 which may be secured in any desired location and by any appropriate means on the frame of the engine to which it is applied. A rotary slide valve 3 preferably made of fibre, hard wood or the like is housed in a recess 2 in the upper part of this frame, the rotation of which is controlled by the engine shaft 4 through the agency of a device to be described later. This rotary slide valve 3 having a port 5 cooperates, for the purpose of supplying fuel, with a fixed seat 6 secured on the frame 1 by any appropriate means. A central channel 7 is bored through this seat 6 and permanently communicates, on the one hand, with the fuel inlet duct which may be screwed for example onto a threaded head 8 and, on the other hand, with the central port 5 of the slide valve 3. This seat 6 has, moreover, ducts 9 varying in number and arrangement according to the number of cylinders which the engine includes. Thus for instance, with a four-cylinder engine the seat 6 will have four ducts 9. Each of these ducts opens onto the surface 10 of the seat 6 in contact with the slide valve 3, and also communicates with one of a group of pipes 11 each of which corresponds to one of the engine cylinders. The said ducts 9 have their orifices immediately over the surface 10 so that during the rotation of the slide valve 3 the central port 5 which always communicates with the fuel inlet duct 7 may successively connect with each of said ducts 9. The duct 7 is thus successively brought into communication with each one of the pipes 11 and, consequently with each of the motor cylinders, which are thus fed successively.

The rotation of the slide valve 3 is obtained in the following manner: The shaft 4 drives a first shaft 13 housed in a bore 14 of the frame 1 through a system of wheel and screw 12. This shaft 13, which at its lower end may rest on a thrust ball bearing 15, has a central recess 16 at its upper end in which fits a second shaft 17 upon which the rotational motion of the shaft 13 is impressed by means of a key 18 integral with said shaft 13 and engaging with a groove 19 of the shaft 17. By means of this device, this latter shaft is caused to rotate whilst at the same time being able to move longitudinally relative to the shaft 13.

This shaft 17 is constantly forced by a spring 22 supported by the bottom of the recess 16 against the slide valve 3 or more precisely against a disc 20 which is rendered solid with the slide valve by means of grub screws such as 21. This thrusting action of the shaft 17 against the slide valve 3 the effect of which is to apply this latter strongly against the surface 10 of the seat 6 and thus to ensure a good fitting tightness, is exerted through the agency of a spherical cap 23, or the like, allowing the slide valve 3 a slight oscillation relative to the shaft 17. For the purpose of rotating the slide valve 3 this shaft 17 has a washer 25 at its upper end which is toothed on the outside as may be particularly seen in Fig. 2 and which is lodged in an internally toothed recess made in the disc 20 described above. By providing a slight play between this washer 25 and the corresponding recess of this disc 20, the slight relative motion of the slide valve 3, which is necessary for it to press exactly against the surface 10 under the thrusting action of the shaft 17, will be always possible. An excellent fitting tightness will consequently be obtained.

Naturally the wheel and endless screw system 12 will be so designed that the slide valve 3 may rotate at the desired speed according to the type of engine to which it is applied. Thus for instance for a four-stroke engine, this slide valve 3 must rotate at half engine speed.

The form of the slide valve 3 and consequently the nature of the surface 10 against which this slide valve bears may vary. In the example of Fig. 1 the valve 3 is of conical form, the surface 10 then being a conical surface of revolution with the same angle at the vertex. The same applies in the example shown in Fig. 3 with the sole difference that in this example the valve is not conical on the outside but on the contrary has a conical recess, and the seat 6 has a conical boss of corresponding angle at the vertex.

Finally, in the case of Fig. 4, the rotary slide valve 3 is flat, the surface 10 of the seat 6 being also flat.

A modified form of construction for rotating the disc 3 has also been represented in Fig. 4. In this case, the shaft 17 does not include a toothed washer 25, but a square head 25ᵃ engaging with slight play in a correspondingly formed recess of the disc 20. This device operates however exactly in similar manner to that of Fig. 1.

It is moreover self-evident that the invention has only been described and represented here in a purely explanatory and by no means limitatory manner and that it could be subjected to various modifications of detail without altering its spirit.

In the foregoing description and in the claims the word "fibre" means a hard substance, generally red, derived from cellulose and commonly used for electrical insulation purposes, for making toothed wheels, shuttles and for various other purposes.

I claim:

1. Fuel distributing device for multi-cylinder engines comprising, in combination, a fixed seat, a rotary slide-valve applied against said seat, a shaft driven from said engine, coupling means between said shaft and said slide valve for rotating said slide valve whilst permitting said slide valve to rock relative to said shaft, said valve having a channel always connecting with a fuel delivery duct in said seat and successively registering with passages in said seat which respectively communicate with the cylinders of said engine.

2. Fuel distributing device for multi-cylinder engines comprising in combination a fixed seat, a rotary slide valve applied against said seat, a shaft driven from said engine, a ball head on one end of said shaft, means for applying said ball head against said rotary valve, said valve having a channel constantly connecting with a fuel delivery duct in said seat and registering successively with passages in said said seat which respectively communicate with the cylinders of said engine.

3. Fuel distributing device for multi-cylinder engines comprising in combination a fixed seat, a rotary slide valve applied against said seat, a disc secured to said valve, a shaft driven from said engine; coupling means between said shaft and said disc, a ball head on one end of said shaft, means for applying said ball head against said disc, said valve having a channel constantly connecting with a fuel delivery duct in said seat and registering successively with passages in said seat respectively communicating with the cylinders of said engine.

4. Fuel distributing device for multi-cylinder engines comprising in combination a fixed seat, a rotary slide valve applied against said seat, a shaft driven from said engine, a disc secured to said valve and having a recess, a correspondingly shaped portion on said shaft engaging with slight play in said recess, a ball head on one end of said shaft, means for applying said ball head against said disc, said valve having a channel and said seat a fuel delivery duct constantly connecting with said channel, said seat having passages respectively communicating with the cylinders of said engine and successively registering with said channel.

5. Fuel distributing device for multi-cylinder engines comprising in combination a fixed seat, a rotary slide valve applied against said seat, a disc secured to the under portion of said valve and having a toothed recess, a shaft driven from said engine, a washer on said shaft toothed externally, said toothed washer engaging with play in said toothed recess, a ball head on one end of said shaft, spring means for applying said ball head against said disc, said valve having a channel and said seat a fuel delivery duct constantly connecting with said channel, said seat having passages respectively communicating with the cylinders of said engine and successively registering with said channel.

6. Fuel distributing device for multi-cylinder engines comprising in combination a fixed seat, a rotary slide valve applied against said seat, a disc secured to the under portion of said valve, a shaft driven from said engine, a second shaft engaging in a recess in said first shaft, a spring between the bottom of said recess and one end of said second shaft, a key secured to said first shaft and engaging in a groove formed in said second shaft, a spherical cap on the other end of said second shaft contacting with said disc and an externally toothed washer on said second shaft engaging with slight play in a toothed recess in said disc.

7. Fuel distributing device for multi-cylinder engines comprising in combination a fixed seat, a rotary slide valve contacting with a conical bearing surface of said fixed seat, a disc secured to the under portion of said valve, a shaft driven from said engine, a second shaft engaging in a recess in said first shaft, a spring between the bottom of said recess and one end of said second shaft, a key secured to said first shaft and engaging in a groove formed in said second shaft, a spherical cap on the other end of said second shaft contacting with said disc and an externally toothed washer on said second shaft engaging in a toothed recess in said disc with slight play.

LOUIS HENRI LIBERT BELLEM.